United States Patent Office 3,649,685
Patented Mar. 14, 1972

3,649,685
PROCESS FOR THE PREPARATION OF
ADIPIC ACID
Sachio Ishimoto, Tokyo, and Koji Nakagawa, Haruo Togawa, and Sumio Chubachi, Iwakuni-shi, Japan, assignors to Teijin Limited, Osaka, Japan
No Drawing. Filed July 15, 1969, Ser. No. 841,985
Claims priority, application Japan, Mar. 1, 1969,
44/15,693
Int. Cl. C07c 55/14
U.S. Cl. 260—533 C  14 Claims

ABSTRACT OF THE DISCLOSURE

A process for the preparation of adipic acid which comprises oxidizing cyclohexane with molecular oxygen in acetic acid solvent at temperatures ranging from 85° to 120° C., in the concurrent presence of an organic carboxylate of cobalt such as cobalt acetate and a bromine compound such as an alkali metal bromide and an alkaline earth metal bromide at such a ratio that the atomic ratio of Br to Co ranges from $1 \times 10^{-4}$ to 1:1, and recovering the formed adipic acid. Thus, adipic acid is formed with high conversion and with an extremely short induction period, and the carboxylate of cobalt and bromine compound of the catalyst system can be recovered.

This invention relates to the preparation of adipic acid by the liquid phase oxidation of cyclohexane.

More particularly, the invention relates to a process for the preparation of adipic acid by oxidation of cyclohexane with molecular oxygen in acetic acid, in the concurrent presence of an organic carboxylate of a cobalt and a minor amount of bromine compound.

A great number of methods for preparation of adipic acid have been proposed among which the single stage oxidation of cyclohexane in liquid phase using molecular oxygen-containing gas is drawing much industrial attention. As such preparation method of adipic acid by the single stage oxidation of cyclohexane, for example, British Pat. No. 1,007,987 proposed the use of compounds which contained oxygen having a valence of minus one or compounds which on reacting with molecular oxygen would form compounds with oxygen having a valence of minus one, as the oxidation initiator. As examples of such initiators, the prior art named ozone; inorganic peroxides such as sodium peroxide, hydrogen peroxide, etc.; organic peroxides such as benzoyl peroxide; peracids such as peracetic acid; aldehydes such as acetaldehyde; ketones such as methyl ethyl ketone and cyclohexanone; and ethers such as diethyl ether.

However, upon reproducing the above process, it was discovered that the process is defective in various points as follows:

(a) The oxidation shows substantially no progress under the action of cobaltous acetate catalyst alone, and separate addition of an initiator is required.

(b) Furthermore, the oxidation shows no substantial progress when a peroxide such as di-tertiarybutyl peroxide is added as the initiator. Also when ozone alone is used as the initiator, an extremely long induction period is required. In addition, generation of ozone is industrially disadvantageous. When cyclohexanone alone is used as the initiator, the cyclohexane conversion to adipic acid fails to reach the level of around 35%, unless the cyclohexanone of at least approximately 8 wt. percent to the reacted cyclohexane is added.

(c) The ketones such as cyclohexanone added to the reaction system are substantially completely consumed and cannot be recovered. Consequently, it is necessary to add fresh ketones or other initiators for each reaction.

Accordingly, the object of the invention is to provide a process for the industrially advantageous preparation of adipic acid from cyclohexane, without using the above initiators.

A further object of the invention is to provide a process for the preparation of adipic acid at high yields by oxidation of cyclohexane with molecular oxygen, using a two-component catalyst system which is commercially available at low cost and not decomposed or consumed during the oxidation reaction.

Other objects and advantages of the invention will become apparent from the following description.

According to the invention, adipic acid is prepared by the process comprising oxidizing cyclohexane with molecular oxygen in an acetic acid solvent at 85–120° C. in the concurrent presence of an organic carboxylate of cobalt and a bromine compound at such a ratio that the atomic ration of Br/Co is $1 \times 10^{-4}$–1:1, and recovering the formed adipic acid.

According to the invention, a catalyst system composed substantially of the following two components, i.e., (A) an organic carboxylate of cobalt, and
(B) a bromine compound is used. The two components (A) and (B) are used at such a ratio that the ratio of bromine atom to cobalt atom, i.e., the atomic ratio of Br/Co, is $1 \times 10^{-4}$–1:1, preferably $1 \times 10^{-3}$–0.7:1. When the atomic ratio exceeds 0.7:1, particularly 1:1, the cyclohexane conversion and adipic acid yield under the reaction conditions of the invention drop abruptly; and when it is less than $1 \times 10^{-3}$:1, particularly less than $1 \times 10^{-4}$:1, a similar tendency is observed.

As the component A in the catalyst system useful for the invention, any organic carboxylate of cobalt or cobalt compound which can form cobalt acetate in acetic acid solvent may be used. In the specification and claims, the term "organic carboxylate of cobalt" is used in the sense inclusive of such cobalt compounds.

Thus, a cobalt salt of any organic carboxylic acid such as saturated or unsaturated aliphatic, cycloaliphatic, and aromatic carboxylic acids can be used. For example, such cobalt salts include those of saturated aliphatic carboxylic acids such as acetic, propionic, butyric, valeric, caproic, stearic, and lauric acids; aliphatic dicarboxylic acids such as succinic, glutaric, and adipic acids; unsaturated aliphatic carboxylic acids such as maleic, linoletic, and linolenic acids; cycloaliphatic carboxylic acids such as cyclohexanecarboxylic and naphthenic acids; and aromatic carboxylic acids such as benzoic, phthalic, isophthalic, and terephthalic acids. Cobalt compounds which can form cobalt acetate in acetic acid, such as cobalt carbonate and oxide can also be used.

However, use of cobalt salts of carboxylic acids of greater carbon numbers is less advantageous in that, with the increase in the carbon number, a correspondingly greater amount of cobalt salt must be used for the reaction. Also in consideration of ready availability and economy, cobalt salts of lower aliphatic carboxylic acids and of aromatic carboxylic acids, inter alia, those of aliphatic monocarboxylic acids of 2–4 carbons, are preferred, the most preferable being those of acetic acid. The cobalt salts may contain water of crystallization, or may be used as anhydrous salts. The salts can be added to the acetic acid used as the solvent in this invention, either as divalent or trivalent salts. Divalent salts are preferred, however, since generally organic carboxylates of cobalt are unstable in the trivalent state, and preparation of trivalent salts requires industrially complicated procedures.

The other constituent of the catalyst system of the invention, that is, the component B, may be any bromine compound. Preferred compounds are, however, those forming bromine ions in the acetic acid used as the solvent in this invention. The amount of the bromine compound must be such that will satisfy the above specified range of atomic ratio, Br/Co.

Examples of useful bromine compounds include bromides of Group I-A metals of the Periodic Table such as Na, K, Li, and Cs; those of Group II-A metals such as Mg, Ca, Sr, and Ba; those of Group II-B metals such as Zn, Cd, and Hg; those of Group III-B metals such as Al, Ga, Tl; those of Group IV-B metals such as Ge, Sn, and Pb; those of Group IV-A metals such as Ti, Zr, and Hf; those of Group V-A metals such as V, Nb, and Ta; those of Group VI-A metals such as Cr, Mo, and W; those of Group VII-A metals such as Mn, Te, and Re; and those of Group VIII metals such as Fe, Co, Ni, Rh, and Pt; hydrobromides of ammonium or organic amines such as ammonium bromide, mono-, di-, and tri-methylammonium bromides, mono-, di-, and tri-ethylammonium bromides, and cyclohexylammonium bromide, etc.; and organic bromides such as benzyl bromide and n-butyl bromide. Among such bromine compounds, bromides of metals and ammonium bromide are preferred. Bromides of metals are equally useful regardless of the type of metals. From an economical standpoint, however, bromides of easily available and small atomic metals are suitable. For example bromides of Na, Li, Mg, Al, K, Ca, Mn, Fe, Co, Ni, Zn, etc. are particularly preferred. Furthermore, bromides of metals of any valence can be used.

It is permissible for the catalyst system of this invention to contain compounds other than the foregoing components A and B. For example, the system may contain peroxides, ketones, aldehydes, etc., but such additional compounds are essentially unnecessary.

For practicing the present invention, for example, the afore-described organic carboxylate of cobalt and bromine compound are added to acetic acid used as the solvent, at the above-specified ratio, and cyclohexane as the starting material is also added to the system, to be contacted with molecular oxygen at 85–120° C., preferably 90–110° C. When the reaction temperature is below 85° C. or exceeds 120° C., cyclohexane conversion is lowered, and consequently adipic acid yield decreases. Preferred cyclohexane conversion and adipic acid yield are obtained particularly when the reaction temperature is maintained at 90–110° C.

As the molecular oxygen-containing gas, pure oxygen, or oxygen diluted with inert gases such as nitrogen, carbon dioxide, etc. for example, air, can be used, while air is the cheapest and most convenient oxidizing agent.

Thus, according to the invention cyclohexane is directly oxidized with molecular oxygen and converted to adipic acid with high cyclohexane conversion and adipic acid yield. Furthermore, when the invention is practiced under the following conditions, the reaction progresses with smoother and more economical operation:

(1) The acetic acid solvent employed is 0.5–10 times, particularly 1—4 times, the cyclohexane by weight.

(2) The pressure in the reaction system is maintained at the level at least sufficient to maintain the acetic acid and cyclohexane at liquid phase, and the partial pressure of molecular oxygen in the reaction system is preferably maintained, at the lowest, 0.5 kg./cm.$^2$ (absolute pressure), particularly at the lowest 1.0 kg./cm.$^2$ (absolute pressure). Incidentally the partial pressure of molecular oxygen in the reaction system has no critical upper limit so far as the oxidation reaction of the invention is concerned. However, when air is used as the molecular oxygen-containnig gas, for example, the total pressure thereof in the reactor of above 50 kg./cm.$^2$-G produces no appreciable advantage with respect to convenient apparatus and reaction operations.

(3) The amounts of the organic carboxylate of cobalt and bromine compound to be added to the reaction system are, when calculated as the atomic ratio of Br/Co as aforesaid, $1 \times 10^{-4}$–1:1, preferably $1 \times 10^{-3}$–0.7:1, inter alia, $1 \times 10^{-3}$–0.5:1, (a) the feed ratio of the organic carboxylate of cobalt to cyclohexane being, when calculated as Co(atom)/cyclohexane (mole), $5 \times 10^{-3}$–$1 \times 10^{-1}$ atom/mole, particularly $8 \times 10^{-3}$–$5 \times 10^{-2}$ atom/mole, and (b) the feed ratio of the bromine compound to cyclohexane being, when calculated as Br(atom)/cyclohexane (mole), $1 \times 10^{-6}$–$1 \times 10^{-2}$, particularly $1 \times 10^{-5}$–$5 \times 10^{-3}$, atom/mole.

Either tank-type or column-type reactors can be used in the invention. Also the reaction can be practiced either batchwise or in continuous flow system, in both cases producing adipic acid at high yields such as 60–80%, by oxidizing cyclohexane with high conversions such as 30–40%.

The reaction mixture resulting from the practice of this invention includes, besides unreacted cyclohexane, acetic acid as the solvent and adipic acid as the product, minor amounts of glutaric acid, succinic acid,, cyclohexyl esters of those acids, and the catalyst, etc. The separation of adipic acid from the reaction mixture is effected, for example, as follows: the reaction mixture is first cooled to precipitate most of the adipic acid, which is subsequently separated by filtration. The remaining filtrate is further distilled, whereby the acetic acid and unreacted cyclohexane are recovered. An organic solvent such as acetone which dissolves the reaction products such as adipic acid but does not dissolve the catalyst is added to the distillation residue to separate the reaction products from the catalyst. Thus adipic acid is recovered from the above acetone solution and the catalyst also is preferably recovered. The recovery means of adipic acid and catalyst from the reaction mixture are not limited to the above-described method, but any known means may be suitably utilized.

Thus in accordance with the present invention, by the concurrent use of an extremely minor amount of bromine compound with an organic carboxylate of cobalt, cyclohexane can be oxidized with practically no induction period and furthermore with high conversion, whereby adipic acid is obtained at single stage reaction and high yield. Still in addition, the catalyst employed is not decomposed and consumed this being unlike the initiator in the prior art proposed in British Pat. No. 1,007,987, and can be advantageously recovered.

Also in the process of above British Pat. No. 1,007,987, organic acid salts of divalent cobalt are oxidized with ozone and/or cyclohexanone, etc. in or outside of the reaction system to be converted to trivalent cobalt salts, and then used as the catalyst. In the catalyst system of this invention, the bromine compound never directly convert the organic carboxylate of divalent cobalt to trivalent salt, regardless of the presence or absence of molecular oxygen, as demonstrated by the experiments I and II below. Therefore, the bromine compound in the invention is not used for direct oxidation of divalent cobalt salt.

EXPERIMENT I

Two (2) g. cobalt acetate tetrahydrate and 0.1 g. of sodium bromide were dissolved in 140 g. of acetic acid, and the solution was heated at 100° C. for 5 hours under stirring. The solution color was constantly violet and never turned the green color characteristic of trivalent cobalt ion. Analysis of the reaction product detected no trivalent cobalt ion.

EXPERIMENT II

Two (2) g. of cobalt acetate tetrahydrate and 0.1 g. of sodium bromide were dissolved in 140 g. of acetic acid, and the solution was heated at 100° C. for 5 hours under stirring and while blowing oxygen gas into the system at a rate of 300 cc./min. The solution color was constantly violet and never turned the green color characteristic of trivalent cobalt ion. Analysis of the reaction product detected no trivalent cobalt ion.

According to the results of experiments I and II, the catalyst system composed of the two components A and B employed in the invention is confirmed to be essentially different from the catalyst system disclosed in the specification of British Pat. No. 1,007,987.

Hereinafter the invention will be explained with reference to working examples, it being understood that the scope of this invention is never to be restricted by the following examples.

$$C \text{ (percent)} = \frac{\text{carboxylic acid obtained equivalent} \times \frac{1}{2}}{\text{initially charged cyclohexane (mole)}} \times 100$$

$$Y \text{ (percent)} = \frac{\text{adipic acid obtained (equivalent)}}{\text{carboxylic acid obtained (equivalent)}} \times 100$$

TABLE 1

| | NaBr (mg.) | Br/Co (atom/ atom) | Br/cyclo- hexane (atom/ mole) | Co/cyclo- hexane (atom/ mole) | Reaction time (min.) | Induc- tion period (min.) | Total carboxylic acid (equiv- alent) | Adipic acid (equiv- alent) | C (per- cent) | Y (per- cent) |
|---|---|---|---|---|---|---|---|---|---|---|
| Control: | | | | | | | | | | |
| 1 | 0 | | | $1.1 \times 10^{-2}$ | 240 | (¹) | 0.069 | | 4.8 | Trace |
| 2 | 0.01 | $1.2 \times 10^{-5}$ | $1.4 \times 10^{-7}$ | $1.1 \times 10^{-2}$ | 240 | (¹) | 0.075 | | 5.2 | Trace |
| Example: | | | | | | | | | | |
| 1 | 0.1 | $1.2 \times 10^{-4}$ | $1.4 \times 10^{-6}$ | $1.1 \times 10^{-2}$ | 290 | 50 | 0.419 | 0.308 | 29.3 | 74.5 |
| 2 | 1 | $1.2 \times 10^{-3}$ | $1.4 \times 10^{-5}$ | $1.1 \times 10^{-2}$ | 270 | 30 | 0.446 | 0.347 | 31.2 | 77.8 |
| 3 | 10 | $1.2 \times 10^{-2}$ | $1.4 \times 10^{-4}$ | $1.1 \times 10^{-2}$ | 240 | 0 | 0.484 | 0.369 | 33.9 | 76.3 |
| 4 | 50 | $6 \times 10^{-2}$ | $7 \times 10^{-4}$ | $1.1 \times 10^{-2}$ | 240 | 0 | 0.503 | 0.364 | 35.2 | 72.3 |
| 5 | 100 | $1.2 \times 10^{-1}$ | $1.4 \times 10^{-3}$ | $1.1 \times 10^{-2}$ | 240 | 0 | 0.507 | 0.374 | 35.4 | 73.8 |
| 6 | 200 | $2.4 \times 10^{-1}$ | $2.8 \times 10^{-3}$ | $1.1 \times 10^{-2}$ | 240 | 0 | 0.486 | 0.352 | 34.0 | 72.4 |
| Control: | | | | | | | | | | |
| 3 | 1,000 | 1.2 | $1.4 \times 10^{-2}$ | $1.1 \times 10^{-2}$ | 240 | 0 | 0.321 | 0.179 | 22.5 | 62.1 |
| 4 | 1,700 | 2.0 | $2.3 \times 10^{-2}$ | $1.1 \times 10^{-2}$ | 240 | (¹) | 0 | 0 | 0 | 0 |

¹ 240 and over.

Example A (Examples 1–6 and Controls 1–4)

A 500-cc. titanium autoclave provided with a gas inlet pipe, reflux condenser and stirrer was charged with 60 g. of cyclohexane, 140 g. of acetic acid, 2.0 g. of cobalt acetate tetrahydrate, and sodium bromide in the amount specified in Table 1. The reaction was performed at a pressure of 10 kg./cm.² G (partial pressure of oxygen: 1.6 kg./cm.² abs.) and temperature of 100° C., for the time specified also in Table 1, while blowing air into the system at a rate of 0.8 liter per minute. After the reaction, the autoclave was cooled to room temperature, and the reaction mixture was withdrawn. The precipitated adipic acid was filtered and separated from the filtrate.

From the filtrate, unreacted cyclohexane and acetic acid were recovered by reduced pressure distillation, and the distillation residue was added to 500-cc. of acetone. Insoluble cobalt acetate was recovered by filtration, and the total amount of carboxylic acid in the filtrate was determined by titration. Also in the carboxylic acid, the respective amounts of adipic acid, glutaric acid, and succinic acid were determined by gas chromatography.

The obtained adipic acid was combined with the previously filtered adipic acid, and yield thereof was determined.

The results were as given in Table 1 below. The cyclohexane conversion (C) was calculated from the equation below:

Example B (Examples 7–10 and Controls 5–8)

A 500-cc. titanium autoclave equipped with a gas inlet pipe, reflux condenser and a stirrer was charged with 60 g. of cyclohexane, 140 g. acetic acid, 2.0 g. of cobalt acetate tetrahydrate, and 0.1 g. of sodium bromide. The reaction was performed at a pressure of 10 kg./cm.² G and at the temperatures specified in Table 2, for 300 minutes, while air was blown into the system at a rate of 0.8 liter per minute. After the reaction the autoclave was cooled to room temperature, and the reaction mixture was treated similarly to Example A. The results were as given in Table 2 below.

TABLE 2

| | Reaction temp. (° C.) | Partial pressure of oxygen (kg./cm.² abs.) | Br/Co (atom/ atom) | Br/cyclo- hexane (atom/ mole) | Co/cyclo- hexane (atom/ mole) | Induc- tion period (min.) | Total carboxylic acid (equiv- alent) | Adipic acid (equiv- alent) | C (per- cent) | Y (per- cent) |
|---|---|---|---|---|---|---|---|---|---|---|
| Control 5 | 80 | 1.7 | $1.2 \times 10^{-1}$ | $1.4 \times 10^{-3}$ | $1.1 \times 10^{-2}$ | 0 | 0.140 | 0.090 | 9.8 | 64.2 |
| Example: | | | | | | | | | | |
| 7 | 90 | 1.7 | $1.2 \times 10^{-1}$ | $1.4 \times 10^{-3}$ | $1.1 \times 10^{-2}$ | 0 | 0.358 | 0.246 | 25.0 | 68.7 |
| 8 | 93 | 1.6 | $1.2 \times 10^{-1}$ | $1.4 \times 10^{-3}$ | $1.1 \times 10^{-2}$ | 0 | 0.497 | 0.366 | 34.7 | 73.6 |
| 9 | 103 | 1.5 | $1.2 \times 10^{-1}$ | $1.4 \times 10^{-3}$ | $1.1 \times 10^{-2}$ | 0 | 0.526 | 0.392 | 36.7 | 74.6 |
| 10 | 113 | 1.5 | $1.2 \times 10^{-1}$ | $1.4 \times 10^{-3}$ | $1.1 \times 10^{-2}$ | 0 | 0.471 | 0.324 | 32.9 | 68.8 |
| Control: | | | | | | | | | | |
| 6 | 122 | 1.4 | $1.2 \times 10^{-1}$ | $1.4 \times 10^{-3}$ | $1.1 \times 10^{-2}$ | 0 | 0.503 | 0.288 | 35.2 | 57.2 |
| 7 | 132 | 1.3 | $1.2 \times 10^{-1}$ | $1.4 \times 10^{-3}$ | $1.1 \times 10^{-2}$ | 0 | 0.562 | 0.302 | 38.5 | 54.4 |
| 8 | 142 | 1.2 | $1.2 \times 10^{-1}$ | $1.4 \times 10^{-3}$ | $1.1 \times 10^{-2}$ | 0 | 0.510 | 0.195 | 35.6 | 38.2 |

Example C (Examples 11–28)

A 500-cc. titanium autoclave equipped with a gas inlet pipe, reflux condenser and stirrer was charged with 60 g. of cyclohexane, 140 g. of acetic acid, 2.0 g. of cobalt acetate tetrahydrate and the bromine compound specified in Table 13. The reaction was performed at a pressure of 10 kg./cm.² G and at various temperatures for various periods as specified in Table 3, while air was blown into the system at a rate of 0.8 liter per minute. Thereafter the autoclave was cooled to room temperature, and the reaction mixture was withdrawn therefrom to be treated similarly to Example A. The results are also given in Table 3.

TABLE 3

| Ex. No. | Bromide | Amount (mg.) | Reaction temp. (° C.) | Partial pressure of oxygen (kg./cm.² abs.) | Br/Co (atom/ atom) | Br/ cyclo- hexane (atom/ mole) | Co/ cyclo- hexane (atom/ mole) | Reac- tion time (min.) | Induc- tion period (min.) | Total carbox- ylic acid (equiv- alent) | Adipic acid (equiv- alent) | C (per- cent) | Y (per- cent) |
|---|---|---|---|---|---|---|---|---|---|---|---|---|---|
| 11 | KBr | 100 | 100 | 1.6 | 1.05×10⁻¹ | 1.1×10⁻³ | 1.1×10⁻² | 240 | 0 | 0.492 | 0.360 | 34.4 | 73.8 |
| 12 | LiBr·H₂O | 100 | 100 | 1.6 | 1.2×10⁻¹ | 1.3×10⁻³ | 1.1×10⁻² | 240 | 0 | 0.520 | 0.383 | 36.4 | 73.0 |
| 13 | NH₄Br | 100 | 100 | 1.6 | 1.3×10⁻¹ | 1.4×10⁻³ | 1.1×10⁻² | 240 | 0 | 0.512 | 0.389 | 35.7 | 76.7 |
| 14 | NH₄Br | 10 | 100 | 1.6 | 1.3×10⁻¹ | 1.4×10⁻⁴ | 1.1×10⁻² | 240 | 0 | 0.520 | 0.383 | 36.3 | 73.3 |
| 15 | NH₄Br | 100 | 110 | 1.6 | 1.3×10⁻¹ | 1.4×10⁻³ | 1.1×10⁻² | 240 | 0 | 0.466 | 0.341 | 32.5 | 73.6 |
| 16 | MnBr₂·4H₂O | 120 | 93 | 1.6 | 1.0×10⁻¹ | 1.2×10⁻³ | 1.1×10⁻² | 300 | 0 | 0.446 | 0.328 | 31.1 | 73.1 |
| 17 | CoBr₂·6H₂O | 160 | 93 | 1.6 | 1.0×10⁻¹ | 1.4×10⁻³ | 1.1×10⁻² | 300 | 0 | 0.528 | 0.365 | 36.9 | 69.3 |
| 18 | MgBr₂·6H₂O | 120 | 93 | 1.6 | 1.0×10⁻¹ | 1.2×10⁻³ | 1.1×10⁻² | 300 | 0 | 0.529 | 0.368 | 37.7 | 68.6 |
| 19 | ZnBr₂ | 90 | 93 | 1.6 | 1.0×10⁻¹ | 1.2×10⁻³ | 1.1×10⁻² | 300 | 0 | 0.510 | 0.335 | 35.6 | 65.3 |
| 20 | NiBr₂·3H₂O | 110 | 93 | 1.6 | 1.0×10⁻¹ | 1.2×10⁻³ | 1.1×10⁻² | 300 | 0 | 0.509 | 0.359 | 35.6 | 70.5 |
| 21 | CaBr₂ | 80 | 93 | 1.6 | 1.0×10⁻¹ | 1.2×10⁻³ | 1.1×10⁻² | 300 | 0 | 0.521 | 0.367 | 36.4 | 70.4 |
| 22 | FeBr₂ | 87 | 93 | 1.6 | 1.0×10⁻¹ | 1.2×10⁻³ | 1.1×10⁻² | 300 | 0 | 0.528 | 0.383 | 36.9 | 72.8 |
| 23 | AlBr₃ | 72 | 93 | 1.6 | 1.0×10⁻¹ | 1.2×10⁻³ | 1.1×10⁻² | 300 | 0 | 0.516 | 0.360 | 36.1 | 69. |
| 24 | CdBr₂·4H₂O | 138 | 93 | 1.6 | 1.0×10⁻¹ | 1.2×10⁻³ | 1.1×10⁻² | 300 | 0 | 0.523 | 0.395 | 36.6 | 75.4 |
| 25 | C₇H₇Br | 140 | 93 | 1.6 | 1.0×10⁻¹ | 1.2×10⁻³ | 1.1×10⁻² | 300 | 77 | 0.452 | 0.320 | 31.6 | 70.8 |
| 26 | n-C₄H₉Br | 110 | 93 | 1.6 | 1.0×10⁻¹ | 1.2×10⁻³ | 1.1×10⁻² | 300 | 94 | 0.440 | 0.340 | 30.7 | 77.3 |
| 27 | CH₃NH₃Br | 90 | 93 | 1.6 | 1.0×10⁻¹ | 1.2×10⁻³ | 1.1×10⁻² | 300 | 0 | 0.466 | 0.360 | 32.5 | 77.3 |
| 28 | C₂H₅NH₃Br | 100 | 93 | 1.6 | 1.0×10⁻¹ | 1.2×10⁻³ | 1.1×10⁻² | 300 | 0 | 0.511 | 0.377 | 35.7 | 73.8 |

Example D (Example 29 and Controls 9–10)

A 500-cc. titanium autoclave equipped with a gas inlet pipe, reflux condenser, and a stirrer was charged with 60 g. of cyclohexane, 140 g. of acetic acid, 0.1 g. of sodium bromide, and cobalt acetate tetrahydrate of various amounts as specified in Table 4. The reaction was performed at a pressure of 10 kg./cm.² G while air was blown into the system at a rate of 0.8 liter per minute, at various temperatures and for various periods as specified also in Table 4. Thereafter the autoclave was cooled to room temperature, and the reaction mixture withdrawn therefrom was treated similarly to Example A. The results were as given in Table 4, in which the results of Example 8 are also shown for convenience of comparison.

Example E (Examples 30, 31)

A 50-cc. titanium autoclave equipped with a gas inlet pipe, reflux condenser, and a stirrer was charged with 60 g. of cyclohexane, 140 g. of acetic acid, 2.0 g. of cobalt acetate tetrahydrate, and 0.1 g. of sodium bromide. The reaction was performed at the various pressures specified in Table 5, at 93° C. for 300 minutes, while air was blown into the system at a rate of 0.8 liter per minute. Thereafter the autoclave was cooled to room temperature, and the reaction mixture withdrawn from the autoclave was treated as in Example A. The results were as given in Table 5, in which the results of Example 8 are also given for convenient comparison.

TABLE 5

| Example: | Reaction pressure (kg./cm.², G) | Partial pressure of oxygen (kg./cm.² abs.) | Br/Co (atom/ atom) | Br/ cyclo- hexane (atom/ mole) | Co/ cyclo- hexane (atom/ mole) | Reaction time (min.) | Induc- tion period (min.) | Total carboxylic acid (equiv- alent) | Adipic acid (equiv- alent) | C (percent) | Y (percent) |
|---|---|---|---|---|---|---|---|---|---|---|---|
| 30 | 15 | 2.4 | 1.2×10⁻¹ | 1.4×10⁻³ | 1.1×10⁻² | 300 | 0 | 0.553 | 0.406 | 38.7 | 73.3 |
| 8 | 10 | 1.6 | 1.2×10⁻¹ | 1.4×10⁻³ | 1.1×10⁻² | 300 | 0 | 0.497 | 0.366 | 34.7 | 73.6 |
| 31 | 5 | 0.8 | 1.2×10⁻¹ | 1.4×10⁻³ | 1.1×10⁻² | 300 | 0 | 0.441 | 0.343 | 30.9 | 77.8 |

Example F (Example 32 and Control 11)

A 500-cc. titanium autoclave equipped with a gas inlet pipe, reflux condenser, and a stirrer was charged with cyclohexane, acetic acid, cobalt acetate tetrahydrate, and sodium bromide of the amounts each indicated in Table 6. The reaction was performed at a pressure of 10 kg./cm.² G and a temperature of 93° C., for 300 minutes, while air was blown into the system at a rate of 0.8 liter per minute. Thereafter the autoclave was cooled to room

TABLE 4

| | Co(OAc)₂· 4H₂O (g.) | Reaction temp. (° C.) | Partial pressure of oxygen (kg./cm.² abs.) | Br/Co (atom/ atom) | Br/ cyclo- hexane (atom/ mole) | Co/ cyclo- hexane (atom/ mole) | Reaction time (min.) | Induc- tion period (min.) | Total carbox- ylic acid (equiv- alent) | Adipic acid (equiv- alent) | C (per- cent) | Y (per- cent) |
|---|---|---|---|---|---|---|---|---|---|---|---|---|
| Example: | | | | | | | | | | | | |
| 8 | 2.0 | 93 | 1.6 | 1.2×10⁻¹ | 1.4×10⁻³ | 1.1×10⁻² | 300 | 0 | 0.497 | 0.366 | 34.7 | 73.6 |
| 29 | 1.0 | 93 | 1.6 | 2.4×10⁻¹ | 1.4×10⁻³ | 5.6×10⁻³ | 300 | 0 | 0.365 | 0.265 | 25.5 | 72.6 |
| Control: | | | | | | | | | | | | |
| 9 | 0.5 | 93 | 1.6 | 4.8×10⁻¹ | 1.4×10⁻³ | 2.8×10⁻⁴ | 300 | 0 | 0.133 | | 9.3 | Trace |
| 10 | 0.1 | 100 | 1.6 | 2.4 | 1.4×10⁻³ | 5.6×10⁻⁴ | 240 | (¹) | 0.034 | | 2.4 | Trace |

¹ 240 and over.

temperature, and the reaction mixture withdrawn from the autoclave was treated similarly to Example A. The results were as indicated in Table 6, in which the results of Example 8 are also shown for convenient comparison.

the concurrent presence of an organic carboxylate of cobalt and a bromine compound at such a ratio that the atomic ratio of Br to Co is within the range of $1\times10^{-4}$ to 1:1, and recovering the formed adipic acid.

TABLE 6

| Ex. No. | Cyclo-hexane (g.) | Acetic acid (g.) | Co(OAc)$_2$ 4H$_2$O (g.) | NaBr (g.) | Partial pressure of oxygen (kg./cm.$^2$ abs.) | Acetic acid/cyclohexane (weight ratio) | Br/Co (atom/atom) | Br/cyclohexane (atom/mole) | Co/cyclohexane (atom/mole) | Induction period (min.) | Total carboxylic acid (equivalent) | Adipic acid (equivalent) | C (percent) | Y (percent) |
|---|---|---|---|---|---|---|---|---|---|---|---|---|---|---|
| 8 | 60 | 140 | 2.0 | 0.1 | 1.60 | 2.34 | 1.2×10$^{-1}$ | 1.4×10$^{-3}$ | 1.1×10$^{-2}$ | 0 | 0.497 | 0.366 | 34.7 | 73.6 |
| 32 | 100 | 100 | 3.3 | 0.17 | 1.60 | 1.00 | 1.2×10$^{-1}$ | 1.4×10$^{-3}$ | 1.1×10$^{-2}$ | 0 | 0.598 | 0.426 | 25.1 | 71.0 |
| 11$^1$ | 140 | 60 | 4.7 | 0.23 | 1.57 | 0.43 | 1.2×10$^{-1}$ | 1.4×10$^{-3}$ | 1.1×10$^{-2}$ | ($^2$) | 0.060 | ...... | 1.8 | Trace |

$^1$ Control.
$^2$ 300 and over.

Example G (Examples 33–36)

A 500-cc. titanium autoclave equipped with a gas inlet pipe, reflux condenser, and a stirrer was charged with 60 g. of cyclohexane, 140 g. of acetic acid, 0.1 g. of sodium bromide and a cobalt compound varied in each example as specified in Table 7. The reaction was performed at a pressure of 10 kg./cm.$^2$ G (partial pressure of oxygen: 1.6 kg./cm.$^2$ abs.), while air was blown thereinto at a rate of 0.8 liter per minute. The reaction was continued for 300 minutes, and thereafter the autoclave was cooled to room temperature. The reaction mixture withdrawn from the autoclave was treated similarly to Example A, with the results as given in Table 7.

We claim:

1. A process for the preparation of adipic acid which consists essentially of oxidizing cyclohexane with molecular oxygen in the liquid phase in an acetic acid solvent at a temperature within the range of 85° to 120° C., in oxidized with molecular oxygen at a temperature within the range of 90° to 110° C.

8. The process of claim 1, wherein the pressure in the reaction system is at least sufficient to maintain the acetic acid and cyclohexane in the liquid phase, and the partial pressure of the molecular oxygen in the reaction system is at least 0.5 kg./cm.$^2$ (absolute pressure).

9. The process of claim 1, wherein 0.5–10 weight times the cyclohexane of acetic acid is used.

10. The process of claim 1, wherein air is used as the molecular oxygen.

11. The process of claim 1, wherein the amount of said organic carboxylate of cobalt, in terms of metal cobalt, is within the range of $8\times10^{-3}$ to $5\times10^{-2}$:1.

12. The process of claim 1, wherein the amount of said bromine compound satisfies the following
  (a) the atomic ratio of Br to Co is $1\times10^{-3}$–$0.7$:1, and
  (b) the Br(atom)/cyclohexane (mole) ratio is $$1\times10^{-5} - 5\times10^{-3}:1$$

13. The process of claim 5, wherein said organic carboxylate of cobalt is cobalt acetate.

14. The process of claim 1, wherein 1–4 weight times the cyclohexane of acetic acid is used.

TABLE 7

| Example No. | Cobalt compound | Amount (g.) | NaBr (g.) | Reaction temp. (°C.) | Partial pressure of oxygen (kg./cm.$^2$ abs.) | Br/Co (atom/atom) | Br/cyclohexane (atom/mole) | Co/cyclohexane (atom/mole) | Reaction time (min.) | Induction period (min.) | Total carboxylic acid (equivalent) | Adipic acid (equivalent) | C (percent) | Y (percent) |
|---|---|---|---|---|---|---|---|---|---|---|---|---|---|---|
| 33 | Co$_2$O$_3$ | 2 | 0.1 | 93 | 1.6 | 4×10$^{-2}$ | 1.2×10$^{-3}$ | 3.4×10$^{-2}$ | 300 | 0 | 0.564 | 0.406 | 39.5 | 71.8 |
| 34 | Co(OH)$_2$ | 2 | 0.1 | 93 | 1.6 | 2.3×10$^{-2}$ | 1.2×10$^{-3}$ | 6×10$^{-2}$ | 300 | 0 | 0.466 | 0.337 | 32.5 | 72.3 |
| 35 | Co$_2$(OH)$_6$(CO$_3$)$_2$ | 2 | 0.1 | 93 | 1.6 | 5×10$^{-2}$ | 1.2×10$^{-3}$ | 2.7×10$^{-2}$ | 300 | 0 | 0.547 | 0.394 | 38.2 | 72.1 |
| 36 | Co$_2$O$_3$ | 0.67 | 0.1 | 93 | 1.6 | 1.2×10$^{-1}$ | 1.2×10$^{-3}$ | 1.1×10$^{-2}$ | 300 | 0 | 0.437 | 0.307 | 30.5 | 70.3 |

(b) the Br(atom)/cyclohexane (mole) ratio is $$1\times10^{-6} - 1\times10^{-2}:1$$

5. The process of claim 1, wherein said organic carboxylate of cobalt is selected from cobalt salts of aliphatic monocarboxylic acids of 2–4 carbons.

6. The process of claim 1, wherein said bromine compound is at least one compound selected from the group consisting of metal bromides and ammonium bromide.

7. The process of claim 1, wherein the cyclohexane is

References Cited

UNITED STATES PATENTS 3,231,608   1/1966   Kollar ........... 260—533 C

FOREIGN PATENTS 5,856   3/1969   Japan ........... 260—533 R
3,924   6/1969   Japan ........... 260—533 R LORRAINE A. WEINBERGER, Primary Examiner
R. D. KELLY, Assistant Examiner